(12) United States Patent
Thomson et al.

(10) Patent No.: US 8,215,430 B2
(45) Date of Patent: Jul. 10, 2012

(54) WHEEL END WITH INTEGRATED MOTOR ASSEMBLY

(75) Inventors: Norval Paul Thomson, Dunlap, IL (US); Steven Alan Daniel, East Peoria, IL (US); Daniel Peter Sergison, East Peoria, IL (US); Avert Glen Vannette, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 456 days.

(21) Appl. No.: 12/150,618

(22) Filed: Apr. 30, 2008

(65) Prior Publication Data
US 2009/0272596 A1 Nov. 5, 2009

(51) Int. Cl.
*B60K 7/00* (2006.01)
*B60K 17/00* (2006.01)

(52) U.S. Cl. ............... 180/65.51; 180/305; 180/307; 180/308; 60/487

(58) Field of Classification Search ............ 180/65.51, 180/305, 307, 308; 60/487
See application file for complete search history.

(56) References Cited

U.S. PATENT DOCUMENTS

| | | | |
|---|---|---|---|
| 2,645,298 A | 7/1953 | Hawkins et al. | |
| 3,391,753 A * | 7/1968 | Anderson | 180/307 |
| 3,584,698 A | 6/1971 | Larson et al. | |
| 3,770,075 A | 11/1973 | Vegners | |
| 3,954,026 A | 5/1976 | Rittmann et al. | |
| 3,958,494 A | 5/1976 | Miller | |
| 3,969,950 A | 7/1976 | Rau et al. | |
| 4,162,713 A | 7/1979 | Heitman et al. | |
| 4,275,616 A | 6/1981 | Ehrlinger et al. | |
| 4,583,425 A | 4/1986 | Mann et al. | |
| 4,685,527 A * | 8/1987 | Oswald et al. | 180/14.3 |
| 4,896,506 A * | 1/1990 | Shivvers et al. | 60/487 |
| 4,930,590 A | 6/1990 | Love et al. | |
| 5,070,695 A | 12/1991 | Metzner | |
| 5,431,245 A | 7/1995 | Beck et al. | |
| 6,135,259 A | 10/2000 | Forster | |
| 6,186,262 B1 | 2/2001 | Mann et al. | |
| 6,402,384 B1 | 6/2002 | Bowman et al. | |
| 6,607,049 B2 | 8/2003 | Cigal | |
| 6,645,107 B2 | 11/2003 | Fukuda | |
| 6,817,960 B2 | 11/2004 | Jolliff et al. | |
| 6,986,406 B1 | 1/2006 | Hauser et al. | |
| 6,994,180 B1 | 2/2006 | Hauser et al. | |
| 7,137,315 B2 | 11/2006 | Chang et al. | |
| 7,162,870 B1 | 1/2007 | Hauser | |
| 7,163,078 B2 | 1/2007 | Moya et al. | |
| 7,201,250 B1 | 4/2007 | Hauser et al. | |

(Continued)

FOREIGN PATENT DOCUMENTS
JP 11257203 9/1999

*Primary Examiner* — J. Allen Shriver, II
*Assistant Examiner* — Bryan Evans
(74) *Attorney, Agent, or Firm* — Finnegan, Henderson, Farabow, Garrett & Dunner LLP

(57) ABSTRACT

A wheel end assembly comprises a wheel hub support housing and a wheel hub drive assembly rotatably connected to the wheel hub support housing. The wheel end assembly also includes a hydraulic motor operatively coupled to the wheel hub drive assembly, the hydraulic motor being disposed to deliver a torque to the wheel hub drive assembly. The wheel end assembly further includes a pump, fluidly coupled to the wheel hub drive assembly and the hydraulic motor, the pump being disposed to provide a flow of hydraulic fluid to the wheel hub drive assembly.

18 Claims, 3 Drawing Sheets

U.S. PATENT DOCUMENTS

| | | |
|---|---|---|
| 7,331,177 B2 | 2/2008 | Sakikawa et al. |
| 2004/0035105 A1* | 2/2004 | Sakikawa .................. 60/487 |
| 2004/0184942 A1 | 9/2004 | Phillips |
| 2005/0207921 A1* | 9/2005 | Gray ............................ 417/437 |
| 2008/0083580 A1 | 4/2008 | White, Jr. |

* cited by examiner

WHEEL END WITH INTEGRATED MOTOR ASSEMBLY

TECHNICAL FIELD

The present disclosure relates generally to wheel end assemblies and, more particularly, to wheel end assemblies that include an integrated drive motor.

BACKGROUND

Typically, wheel ends are manufactured separately and independently from the drive assembly and, as a result, the wheel end and drive assembly typically comprises separate systems that are fluidly sealed from one another. In some situations, the separate manufacturing of the wheel end and drive assembly allows machine designers some flexibility in selecting the appropriate combination of wheel end and drive assembly units based the size and desired function of the machine.

Often, however, the flexibility provided by such separate manufacturing of the wheel end and drive assembly comes at the expense of the size and material cost associated with the drive system. For example, in order to properly modify the structure of a drive assembly to fit a particular wheel end (or vise versa), a customized adaptor may be required. Such adaptors may significantly increase manufacturing and production costs associated with the machine. Furthermore, customized adapters may unnecessarily add to the weight and overall footprint of the drive, thus decreasing machine power/weight ratio. Therefore, in order to reduce or eliminate manufacturing and production costs of wheel ends and drive assemblies, as well as limit the weight and footprint of the drive assembly, a wheel end with a fully integrated drive assembly may be required.

One system that integrates a hydrostatic wheel end and drive assembly into a single unit is described in U.S. Pat. No. 6,186,262 ("the '262 patent") to Mann et al. The '262 patent discloses a hydrostatic wheel drive having a radial piston motor, a planet gear drive assembly, and an integrated brake that, when activated, prevents rotation of the radial piston motor, thereby prohibiting rotation of the wheel drive. The hydrostatic wheel drive of the '262 patent also comprises a cover with integrated valves for adjusting fluid connections of certain cylinders of the radial piston motor between. For example, the valves may be selectively operated to fluidly couple one or more cylinders in parallel (thereby increasing displacement) for low-speed machine applications. Alternatively, the valves may be selectively operated to fluidly couple one or more cylinders in series (thereby increasing displacement), which may be advantageous for machine applications requiring operation at low to moderate speeds.

The motor of hydrostatic wheel drive described in the '262 patent is on a separate fluid circuit from the final drive assembly, thereby requiring separate hydraulic fluid circulation systems—e.g., one for circulating hydraulic fluid for operation of the motor and one for circulating oil for lubricating the drive components (e.g., gear units, etc.) Consequently, machines that rely on multiple hydraulic systems for operating the drive pump/motor assembly and lubricating the final drive components may require multiple filters, conduit systems, reservoirs, etc., significantly increasing material costs for each wheel assembly. Moreover, because each hydraulic system requires separate periodic maintenance (e.g., fluid/filter change, inspection, etc.), maintenance costs and repair times associated with machines such separate maintenance may be substantial.

SUMMARY

In accordance with one aspect, the present disclosure is directed toward a wheel end assembly, comprising a wheel hub support housing and a wheel hub drive assembly rotatably connected to the wheel hub support housing. The wheel end assembly may also include a hydraulic motor operatively coupled to the wheel hub drive assembly, the hydraulic motor being disposed to deliver a torque to the wheel hub drive assembly. The wheel end assembly may further include a pump, fluidly coupled to the wheel hub drive assembly and the hydraulic motor, the pump being disposed to provide a flow of hydraulic fluid to the wheel hub drive assembly.

According to another aspect, the present disclosure is directed toward a method for regulating a flow of hydraulic fluid associated with a wheel end assembly, comprising receiving a flow of hydraulic fluid from a hydraulic circuit, the hydraulic circuit including a pump fluidly coupled to a wheel hub drive assembly and a hydraulic motor. The method may also include directing, by the pump, at least a portion of the flow of hydraulic fluid into a wheel hub support housing that comprises at least a portion of the wheel hub drive assembly for lubricating the at least a portion of the wheel hub drive assembly.

In accordance with another aspect, the present disclosure is directed toward a machine, comprising a power source configured to generate a mechanical power output, a hydraulic pump, coupled to the power source and configured to generate a flow of hydraulic fluid in response to the mechanical power output, and a plurality of wheel end assemblies coupled to the hydraulic pump via a hydraulic circuit. The hydraulic circuit may include a hydraulic fluid that, when circulated by the hydraulic pump, provides a flow of hydraulic fluid for operating a hydraulic motor associated with each wheel end assembly. The hydraulic circuit may also include a scavenge pump fluidly coupled to each of the plurality of wheel end assemblies for directing at least a portion of the flow of hydraulic fluid into a wheel hub support housing for lubricating a wheel hub drive assembly.

DETAILED DESCRIPTION

Figure 1:
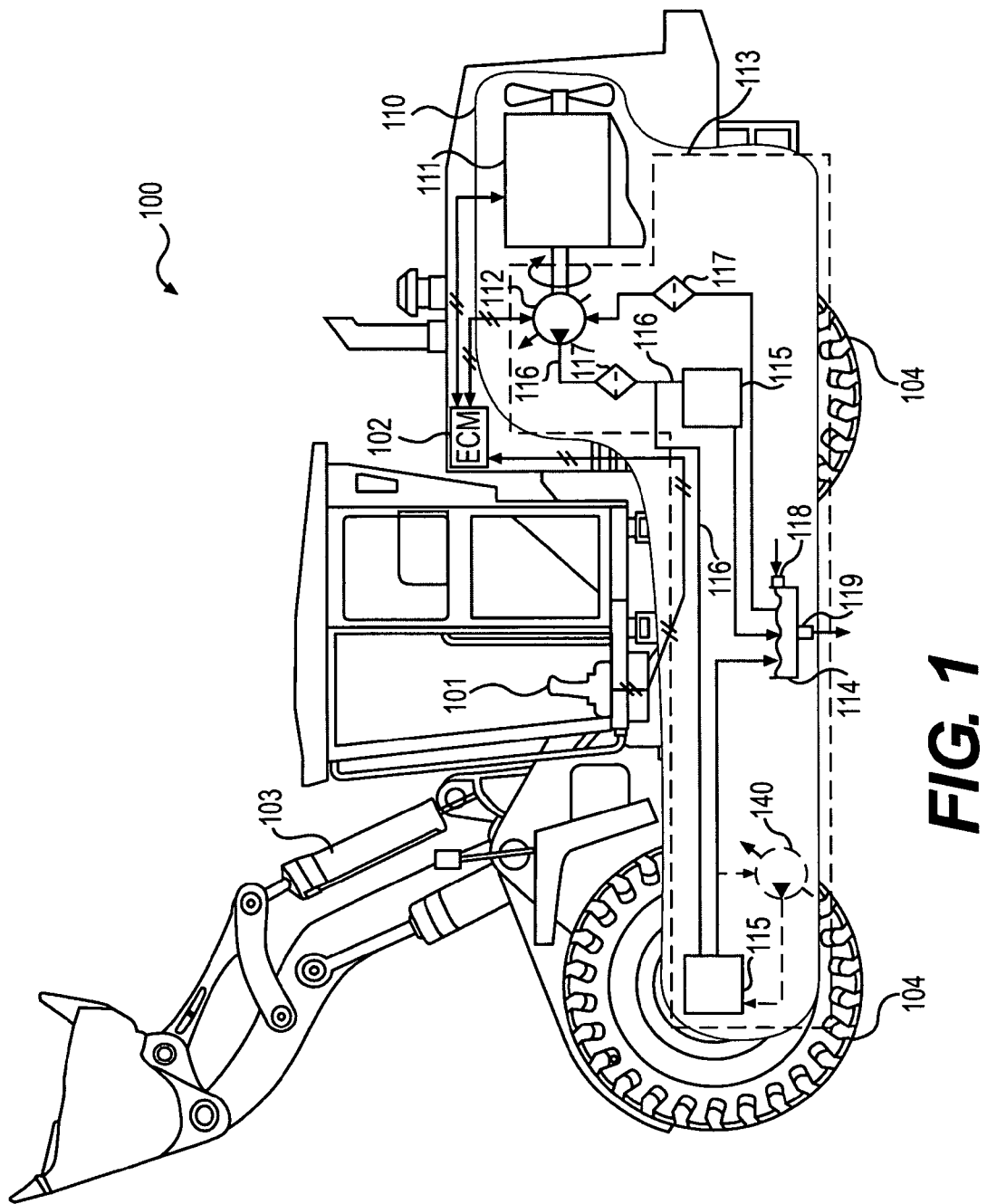
FIG. 1 illustrates an exemplary machine consistent with the disclosed embodiments.

FIG. 1 illustrates an exemplary machine 100 consistent with certain disclosed embodiments. Machine 100 may include or embody any fixed or mobile machine that in which a wheel end assembly may be employed for performing an operation associated with a project environment. Machine 100 may include, for example, skid steers, wheel tractor scrapers, wheel loaders, motor graders, and any other machine that may include a wheel end assembly. Accordingly, although FIG. 1 illustrates machine 100 as a wheel loader, machine 100 may be any type of machine operable to perform an operation within a project environment.

Machine 100 may include a plurality of components that cooperate to perform an operation associated with a project environment. According to one exemplary embodiment and as illustrated in FIG. 1, machine 100 may include, among other things, a control interface 101 operatively coupled to an electronic control module (ECM) 102, an implement or work tool 103 for performing a task in response to an operator command, an engine 111, and a hydraulic drive system 110 configured to position, maneuver, propel, and/or otherwise move machine 110 by way of operation of traction devices 104. The components and features listed above are exemplary only and not intended to be limiting. Furthermore, it is contemplated that machine 100 may embody a different type of machine than is illustrated in FIG. 1, with additional, fewer, and/or different components and features.

Control interface 101 may include one or more components configured to receive operator commands and distribute the received commands to ECM 102 for processing. ECM 102 may include any type of controller adapted to receive data input from a plurality of components and subsystems of machine 100, analyze the received data input, and determine, based on the analysis, an appropriate response to the received data input. According to one embodiment, ECM 102 may receive an operator command to move or reposition machine 100 and, in response the command, generate a control signal for operating hydraulic drive system 110 in a manner consistent with the operator command. Alternatively, ECM 102 may receive an operator command to move or operate implement 103 and generate a control signal for operating the requisite components and subsystems of machine 100 to effectuate operation of implement 103 consistent with the operator command signal.

Implement 103 may include any operator-controllable component or subsystem for performing a task associated with machine 100. Implement 103 may include or embody a bucket, a blade, a boom arm, or any other hydraulically-actuated implement. Implement 103 may include a hydraulic cylinder for operating or moving implement 103.

Traction devices 104 may include any ground- or track-engaging device that may be mounted to a rotatable hub portion of hydraulic drive system 110 and, when rotated by a drive portion of hydraulic drive system 110, may be used to propel, maneuver, or otherwise move machine 110 relative to the terrain on which machine 110 travels. Traction devices 104 may include, for example, hub-mounted tires, hub-mounted sprockets associated with circular chain-type tracks, hub-mounted train wheels, or any other suitable type of ground or track-engaging device.

Engine 111 may include an internal combustion engine such as, for example, a diesel engine, gasoline engine, natural gas engine (or other gaseous fuel-powered engine), or any other engine suitable for generating a mechanical power output. It is contemplated that as an alternative or in addition to a combustion engine, engine 111 may embody an electrical motor powered by an electrical power source such as a rechargeable battery, a fuel cell, a solar panel, a gas turbine, or any other suitable electrical power source.

Hydraulic drive system 110 may include a plurality of components adapted to propel, maneuver, position, or otherwise move, machine 100. For example, hydraulic drive system 110 may include, a hydraulic pump 112 coupled to a hydraulic circuit 113 and configured to circulate a hydraulic fluid throughout hydraulic circuit 113, a reservoir 114 for storing excess hydraulic fluid associated with hydraulic circuit 113, and/or one or more integrated wheel end assemblies 115.

Hydraulic pump 112 may include any type of pump suitable for circulating hydraulic fluid within one or more hydraulic systems associated with machine 100, such as hydraulic circuit 113. For example, hydraulic pump 112 may include, for example, a rotary-piston pump, a bent axis piston pump, a swash plate-type axial piston pump, a gear pump, a vane pump, or any other suitable pump that may be adapted to circulate a fluid for driving a plurality of hydraulic motors. According to one exemplary embodiment, hydraulic pump 112 may be coupled to a common hydraulic circuit, such as hydraulic circuit 113, and may be configured to generate a flow of fluid sufficient to drive a hydraulic motor associated with one or more wheel end assemblies 115. It is contemplated that machine 100 may include multiple hydraulic pumps, at least one of which may be dedicated to operating hydraulically-controlled implements, components, and subsystems and one or more of which may be dedicated to operating one or more wheel end assemblies 115.

Hydraulic circuit 113 may include one or more components or devices that comprise or define a common fluid flow path. According to one embodiment, hydraulic circuit 113 may be associated with a hydraulic drive circuit that includes hydraulic pump 112, one or more wheel end assemblies 115, fluid reservoir 114 for storing excess hydraulic fluid and providing a common fluid refill port 118 and fluid drain port 119 for hydraulic circuit 113, and filters 117 for remove excess particulate matter from the hydraulic fluid. Components and devices associated with hydraulic circuit 113 may be fluidly coupled via a plurality of fluid channels 116, which are arranged to define a desired hydraulic fluid flow path for distributing hydraulic fluid between or among components of hydraulic circuit 113. Optionally, implement 103 may be fluidly coupled to the same hydraulic circuit 113 as one or more wheel end assemblies 115.

Optionally, hydraulic circuit 113 may include a pump 140 coupled to one or more wheel end assemblies. Pump 140, which will be described in greater detail below may embody an external pump, such as pump 140 illustrated in FIG. 1, or an internal pump (illustrated below in FIGS. 2A and 2B). As will be explained in greater detail below, pump 140 may be fluidly coupled to hydraulic circuit 113 and configured to recirculate a flow of hydraulic fluid used to power a hydraulic motor associated with wheel end assembly 115 back into a portion of wheel end assembly 115 for lubricating the wheel end assembly 115.

Figure 2A:
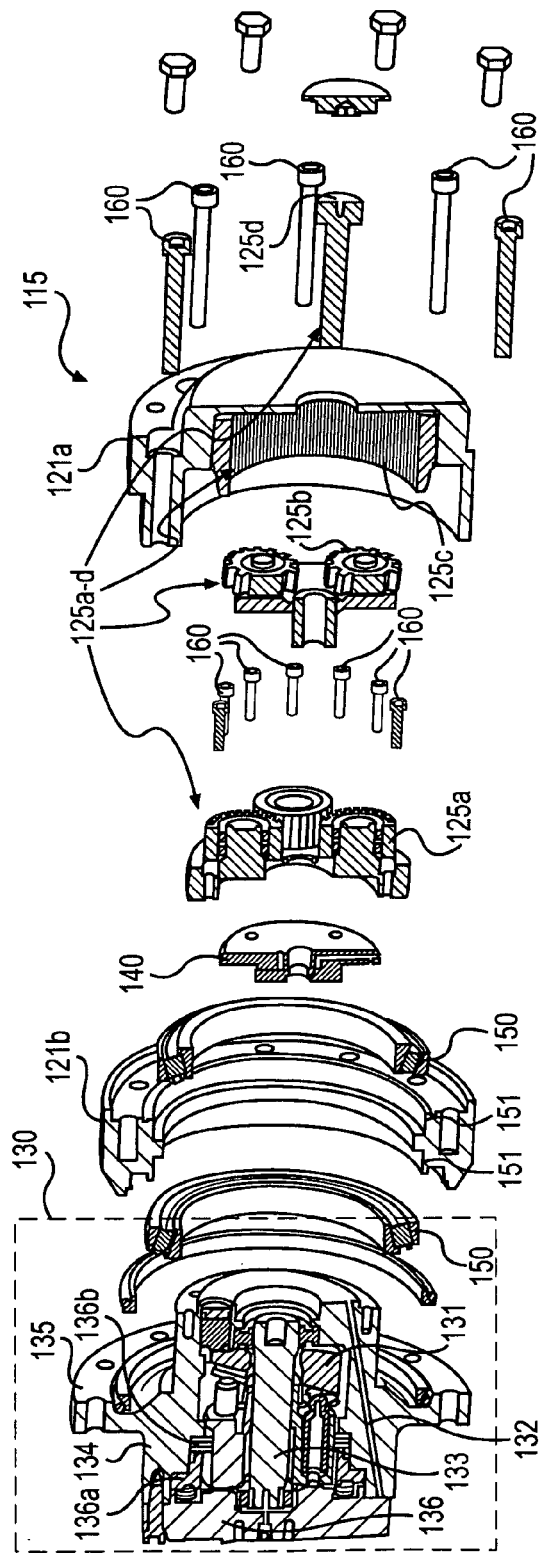
FIG. 2A illustrates a perspective exploded view of an exemplary wheel end assembly with an integrated motor assembly, consistent with the disclosed embodiments.
Figure 3:
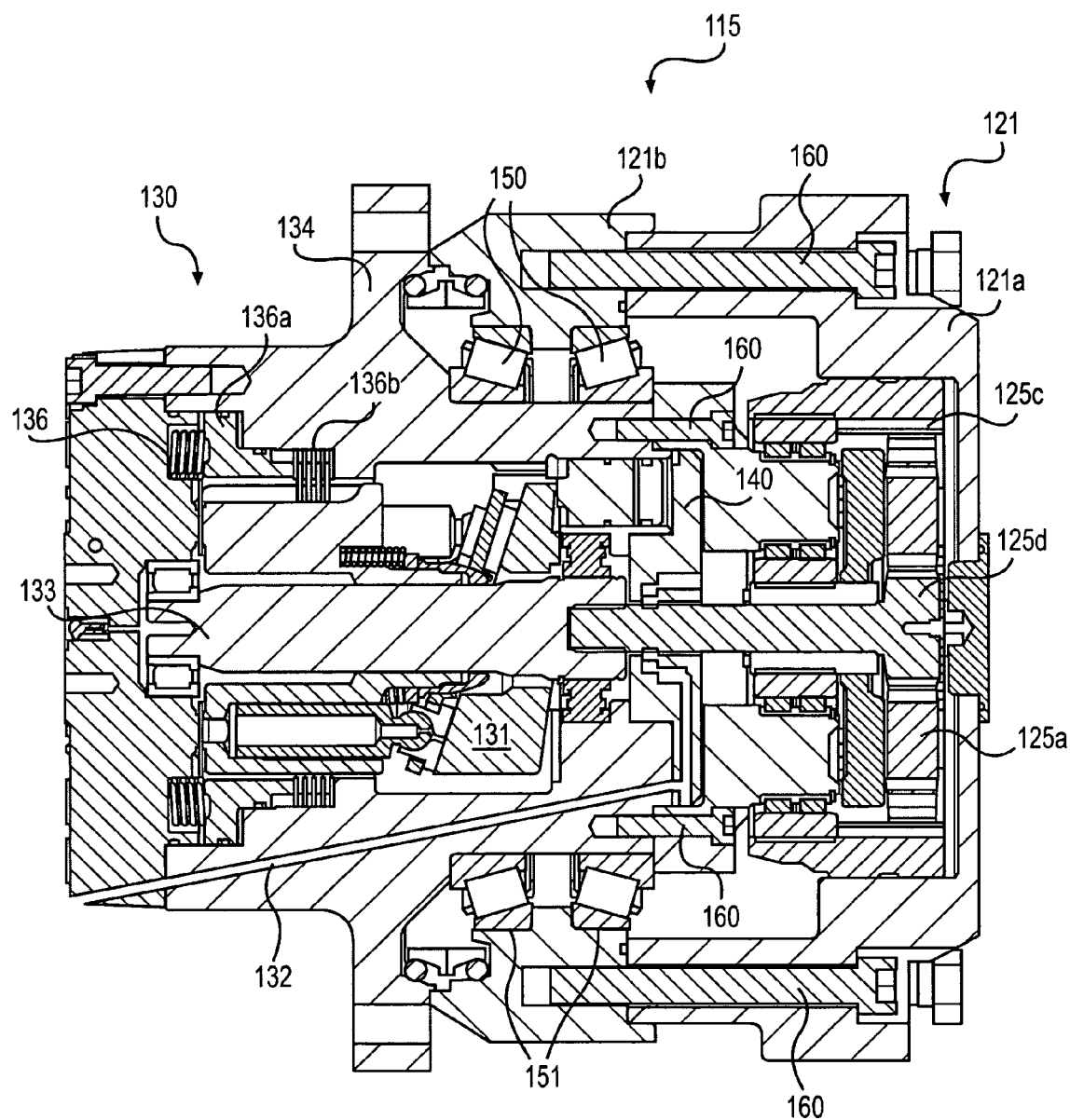
FIG. 3 illustrates a cross-sectional side view of the wheel end assembly illustrated in FIG. 2A, consistent with the disclosed embodiments.

Wheel end assemblies 115 may include one or more hydraulic components for rotating a portion (e.g., wheel hub, sprocket, etc.) of traction devices 104. FIGS. 2A and 3 provide an exploded perspective view and a cross-sectional side view, respectively, of a wheel end assembly 115. Wheel end assembly 115 may include, among other things, a wheel hub support housing 121, a wheel hub drive assembly 125a-d disposed within wheel hub support housing 121, a hydraulic motor 130 configured to deliver torque to the wheel hub drive assembly 125, and a pump 140 configured to regulate a flow of hydraulic fluid associated with each of wheel hub drive assembly 125a-d and hydraulic motor 130.

Wheel end assembly 115 may also include a plurality of components for assembling wheel hub support housing 121, wheel hub drive assembly 125, hydraulic motor 130, and/or pump 140' into a single unit. For example, wheel end assembly 115 may include one or more sets of bearings 150 configured to rotatably support wheel hub support housing 121 upon a portion of hydraulic motor 130. Wheel end assembly 115 may also include a plurality of fasteners 160 configured to secure components of wheel hub drive assembly 125a-d to hydraulic motor 130. Fasteners 160 may also be provided to secure wheel hub support cover 121a to housing flange 121b to form wheel hub support housing 121.

Wheel hub support housing 121 may include one or more structural components for covering and containing final drive components, such as wheel hub drive assembly 125. According to one exemplary embodiment, and as illustrated in FIG. 2A, wheel hub support housing 121 may include wheel hub support cover 121a and housing flange 121b that, when fastened together, form a protective and supportive covering for wheel hub drive assembly 125. It is contemplated that, although wheel hub support housing 121 is illustrated as being comprised of separate components, wheel hub support housing 121 may be manufactured as a single unit, combining the functionality of wheel hub support cover 121a and housing flanges 121b into a single integrated unit.

Wheel hub drive assembly 125a-d may include one or more components for rotating wheel hub support housing 121 relative to hydraulic motor 130. According to one exemplary embodiment, wheel hub assembly may include a plurality of gear components 125a-d. As illustrated in FIG. 2A, gear components 125a-d may comprise a planetary gearset that includes a sun gearshaft 125d adapted to interact with one or more planetary gears 125a, 125b, at least one of which is adapted to interact with a ring gear 125c. Selective rotation of the one or more of planetary gears 125a, 125b, sun gearshaft 125d, and ring gear 125c relative to the other gears produces a torque output, thereby rotating ring gear 125c, which is connected to wheel hub support housing 121 and tractions devices 104 that may be coupled thereto. It is contemplated that multiple stages of planetary gears may be provided, based on desired torque output, speed, and efficiency capabilities of machine 110.

Hydraulic motor 130 may embody any type of pump-driven hydraulic motor that can be scaled to fit substantially within wheel hub support housing 121. According to one embodiment, hydraulic motor 130 may embody an axial-piston or swash plate-type hydraulic motor. Alternatively, hydraulic motor 130 may include a radial-piston hydraulic motor.

Hydraulic motor 130 may include a fluid chamber 131 adapted to receive a flow of hydraulic fluid from hydraulic pump 112. The flow of pressurized hydraulic fluid introduced into fluid chamber 131 causes rotation of a shaft 133 associated with hydraulic motor 130. Shaft 133 may be coupled to sun gearshaft 125d of wheel end drive assembly 125 and configured to rotate sun gearshaft 125d, causing rotation of planetary gears 125a, 125b which, in turn, induces rotation of ring gear 125c, thereby producing a rotational force that acts on wheel hub support housing 121.

Hydraulic motor 130 may be adapted to fit substantially within wheel hub support housing 121 so as to limit or reduce the axial length of wheel end assembly 115. For example, hydraulic motor 130 may include a housing 134 having a narrow, cylindrical portion 135 with a diameter appropriately sized to nest within a wheel hub support housing 121. Narrow portion 135 of housing 134 of hydraulic motor 130 may be adapted to engage an inner diameter of bearings 150, so as to provide radial support for a portion of wheel hub support housing 121 (e.g., housing flange 121b) through bearings 150, while allowing wheel hub support housing 121 to rotate relative to hydraulic motor 130. Housing 134 of hydraulic motor may also include a mounting flange 137 or any other suitable mounting assembly/configuration for securing hydraulic motor 130 to a frame or chassis of machine 100.

Hydraulic motor 130 may optionally include a parking brake mechanism 136. Parking brake mechanism 136 may include a spring-actuated friction member 136a that selectively engages a plurality of teeth members 136b associated with hydraulic motor 130. When engaged, spring-actuated friction member 136a is pressed against teeth members 136b, thereby exerting a significant frictional force on hydraulic motor 130, which may substantially prevent rotation and, therefore, operation of hydraulic motor 130.

Bearings 150 may include any type of radial bearing that permits rotational motion of wheel hub support housing relative to hydraulic motor 130. According to one embodiment, bearings 150 may include a complimentary set of tapered roller bearings adapted to fit in respective slots 151 of housing flange 121b of wheel hub support housing 121. Slots 151 are configured to hold bearings 150 in position in order to prevent one set of bearings from contacting the other and to limit lateral movement of bearings 150 relative to housing flange 121b. Although bearings 150 are illustrated in FIG. 2A as tapered roller bearings, it is contemplated that any type of radial bearing may be employed, such as, for example, roller bearings, thrust bearings, spherical roller bearings, needle bearings, angular contact bearings, or any other suitable type of radial bearing set.

Pump 140 may include any suitable device for circulating and/or regulating the flow of fluid associated with wheel hub drive assembly 125a-d and hydraulic motor 130. According to one embodiment, pump 140 may be configured to draw hydraulic fluid that is used to operate hydraulic motor 130 into wheel hub support housing 121 for lubricating wheel hub drive assembly 125a-d or components associated therewith (e.g., sun gearshaft 125d, planetary gearset(s) 125a, 125b, and/or ring gear 125c). For example, pump 140 may be disposed within one or more of wheel hub support housing 121 and/or housing 134 of hydraulic motor 130. Alternatively or additionally, pump 140 may include embody an external hydraulic pump (such as hydraulic pump 112), fluidly coupled to each of fluid chamber 131 of hydraulic motor 130 and wheel hub support housing 121 to generate and/or regulate hydraulic fluid flow for operating hydraulic motor 130 and for lubricating components disposed within wheel hub support housing 121.

Figure 2B:
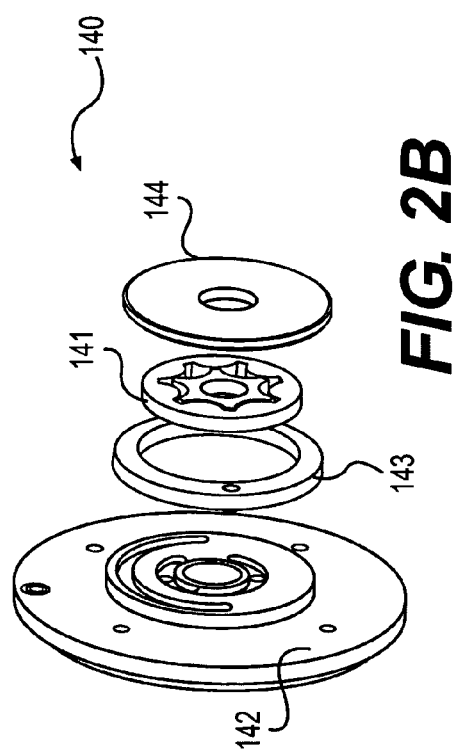
FIG. 2B illustrates a perspective exploded view of an exemplary pump for the wheel end assembly, in accordance with the disclosed embodiments.

FIG. 2B illustrates an exemplary configuration of pump 140, consistent with certain disclosed embodiments. As illustrated in FIG. 2B, pump 140 may be configured for mounting on at least one of shaft 133 of hydraulic motor 130 or sun gearshaft 125d of wheel hub drive assembly 125. According to one embodiment, pump 140 may include any suitable positive displacement pump that may be adapted to fit within housing 134 of hydraulic motor 130 and/or within wheel hub support housing 121. For example, pump 140 may include an internal gear pump, such as a gerotor (as shown in FIG. 2B). Alternatively, pump 140 may include an external gear pump, an impeller-type pump, or any other suitable positive displacement pump.

Regardless of whether pump 140 is implemented as an internal pump or an external pump, pump 140 may be configured as a scavenge pump. As such, pump 140 may be fluidly coupled to the same fluid circuit (e.g., hydraulic circuit 113) that provides pressurized hydraulic fluid for operating hydraulic motor 130 and configured to divert a portion of the hydraulic fluid into wheel hub support housing 121 for lubricating wheel hub drive assembly 125a-d. By configuring pump 140 as a scavenge pump on the same fluid circuit that provides hydraulic fluid to operate hydraulic motor 130 and eliminating the need for separate hydraulic fluid systems for operating the motor and lubricating the wheel end, the presently disclosed embodiments provide a solution for consolidating (what traditionally included separate hydraulic fluid systems) into a single fluid system.

In embodiments where pump 140 is disposed within housing 134 of hydraulic motor 130 or wheel hub support housing 121, pump 140 may include a slotted valve plate 142, for selectively enabling fluid flow into and/or between one or more of hydraulic motor 130 or wheel hub support housing 121. Optionally, pump 140 may also include a restrictor ring 143 for limiting the amount of rotation of valve plate 142 for regulating the direction and volume of fluid flow through valve plate 142. Pump 140 may also include a cover 144 for properly sealing pump 140, which enables pump 140 to generate the requisite suction and compression required to generate positive displacement fluid flow. Pump 140 may draw (or "scavenge") hydraulic fluid from hydraulic circuit 113 via fluid channel 132, which may be provided through housing 134 of hydraulic motor 130 and/or wheel hub support housing 121.

As explained, as an alternative or in addition to an internal pump disposed within one or more of housing 134 of hydraulic motor 130 or wheel hub support housing 121, pump 140 may include an external pump, such as hydraulic pump 112 for circulating hydraulic fluid throughout hydraulic circuit 113. Although an external pump may increase the manufacturing cost (e.g., cost of additional housing and connections) and weight (e.g., weight of additional housing, connections, etc.) of wheel end assembly 115 when compared with an internal pump, an external pump may be more easily accessible than an internal pump. Additionally, external pumps need not conform to the rigid size requirements imposed on an internal pumping mechanism that is designed to fit in the relatively restricted area within either (or both) of housing 134 or wheel hub support housing 121.

Pump 140 may be configured to maintain a level of hydraulic fluid flow sufficient to effectively lubricate wheel hub drive assembly 125. For example, in embodiments where pump 140 embodies a gerotor 141, the gerotor may be coupled to sun gearshaft 125*d* such that the flow rate of hydraulic fluid through the gerotor is based on the speed of sun gearshaft 125*d*. Consequently, as the speed of sun gearshaft 125*d* increases (corresponding with a high-speed operation wheel end assembly 115), the speed of gerotor 141 also increases, thereby increasing the flow of lubricant into wheel hub support housing 121. Similarly, as the speed of sun gearshaft 125*d* decreases (corresponding with a low-speed operation of wheel end assembly 115), the speed of gerotor 141 decreases, thereby decreasing the flow of lubricant into wheel hub support housing 121.

By regulating the flow of hydraulic fluid associated with wheel hub support housing 121 based on, for example, a speed of sun gearshaft 125*d*, wheel end assembly 115 may be configured to ensure that a sufficient (but not excessive) volume of lubricant is injected into wheel hub support housing 121. Furthermore, such regulation may also limit excessive buildup of hydraulic fluid within wheel hub support housing 121, which can present significant resistance for wheel hub drive assembly 125*a-d* and one or more of its constituent components, which may potentially result in decreased efficiency of the hydrostatic wheel end.

Industrial Applicability

The wheel end assembly consistent with embodiments disclosed herein provides a solution for integrating hydraulic motor and wheel end drive components for heavy machines into a single, compact unit. Integrating the hydraulic motor and wheel hub drive components into a single unit allows for convenient fluid coupling of the hydraulic motor and wheel hub drive components to a common hydraulic fluid circuit, thereby enabling lubrication of wheel hub drive components with the hydraulic fluid used to power the hydraulic motor. Furthermore, by providing a pump mechanism in the fluid circuit between the hydraulic motor and the wheel hub support housing (which contains the wheel hub drive components), the wheel end assembly described herein may be configured to regulate the flow of fluid in the wheel hub support housing to maintain an appropriate fluid level in wheel hub support housing.

Although certain disclosed embodiments are described and illustrated as being associated with a motor grader or other wheel-driven machine, it may be applicable to any machine that utilizes a variable speed hydraulic drive system where it may be advantageous to reduce the size and weight of the final drive components. Specifically, the wheel end assembly described herein may be particularly advantageous in machines having limited axial space or strict weight requirements, where conventional hydraulic drive assemblies may unnecessarily increase the weight and footprint of the machine.

The presently disclosed wheel end assembly may have several advantages. For example, the wheel end assembly described herein combines hydraulic motor components and wheel end drive components in a single, compact unit. By integrating the hydraulic motor and drive components in a single system, the hydraulic motor and drive components may be adapted share components and features that are required by each system (e.g., a common housing and fluid circuit, hydraulic pump, reservoir, etc.), thereby eliminating the need for certain duplicate components. As a result, the presently disclosed wheel end assembly may significantly reduce manufacturing and material costs when compared with conventional hydraulic drive assemblies that employ separate hydraulic motor and drive assembly systems.

Furthermore, wheel end assembly systems consistent with the disclosed embodiments may reduce maintenance costs associated with the drive assembly. For example, in conventional hydrostatic drives, the hydraulic motor and drive assembly are fluidly isolated from one another (i.e., hydraulic motor and drive assembly are located on different hydraulic circuits), each requiring separate and independent scheduled service and maintenance. In contrast, the wheel end assembly described herein includes a hydraulic motor and drive assembly that are configured to share the same hydraulic circuit. Consequently, the hydraulic fluid for both the hydraulic motor and drive components may be serviced and recharged simultaneously at a single access point, thereby eliminating maintenance costs associated with servicing separate fluid systems. Maintenance costs may be further reduced by configuring multiple wheel end assemblies associated with a machine to share a single hydraulic circuit, providing the same fluid input and output hydraulic service points for a plurality of wheel ends located on the machine.

In addition, the presently disclosed wheel end assembly may increase drive efficiency. For example, conventional lubrication systems for drive assemblies simply pump hydraulic fluid into the drive gearset housing, often unnecessarily overfilling the drive housing, potentially presenting excessive fluid resistance to the gearset, thus reducing machine drive efficiency. In contrast, the wheel end assembly described herein includes a pump that regulates the flow of hydraulic fluid into the wheel hub support housing based on the fluid requirements of the drive gear system. Such regulation ensures the presence of a fluid level sufficient to adequately lubricate the drive gears without creating excessive drag, which may result in an increase in machine drive efficiency when compared with drive systems that pump hydraulic fluid into the gearset housing, without regulation.

What is claimed is:

1. A wheel end assembly, comprising:
   a wheel hub support housing;
   a wheel hub drive assembly rotatably connected to the wheel hub support housing;
   a hydraulic motor operatively coupled to the wheel hub drive assembly, the hydraulic motor being disposed to deliver a torque to the wheel hub drive assembly; and
   a pump, fluidly coupled to the wheel hub drive assembly and the hydraulic motor, the pump being disposed to direct a flow of hydraulic fluid directly to the wheel hub drive assembly, and the hydraulic motor being operable to drive the wheel hub drive assembly when the pump is directing a flow of hydraulic fluid to the wheel hub drive assembly.

2. The wheel end assembly of claim 1, wherein the wheel hub support housing includes a housing flange, an internal surface of which is adapted to fit around a portion of the hydraulic motor to define a rotational interface between the wheel hub support housing and the hydraulic motor.

3. The wheel end assembly of claim 2, further including a plurality of tapered roller bearings adapted to fit substantially between the internal surface of the housing flange and the portion of the hydraulic motor, the plurality of tapered roller bearings adapted to facilitate rotation of the wheel hub support housing relative to the hydraulic motor.

4. The wheel end assembly of claim 1, wherein the hydraulic motor includes an axial-piston motor.

5. The wheel end assembly of claim 4, wherein the hydraulic motor further includes a parking brake that, when engaged, prevents rotation of a rotor of the axial-piston motor.

6. The wheel end assembly of claim 1, wherein the pump includes a gerotor disposed substantially at an input of the wheel hub support housing for regulating the flow of hydraulic fluid associated with the wheel hub drive assembly.

7. The wheel end assembly of claim 1, wherein the pump is disposed external to the wheel hub support housing and the hydraulic motor.

8. The wheel end assembly of claim 1, wherein the wheel hub support housing and the hydraulic motor are fluidly coupled to a common hydraulic fluid circuit, wherein the common hydraulic fluid circuit is configured to direct the flow of hydraulic fluid to the hydraulic motor and the wheel hub drive assembly.

9. The wheel end assembly of claim 8, wherein the pump is further configured draw hydraulic fluid for lubricating the wheel hub drive assembly via a fluid channel provided within one or more of a housing associated with the hydraulic motor and the wheel hub support housing.

10. A machine, comprising:
    a power source configured to generate a mechanical power output;
    a hydraulic pump, coupled to the power source and configured to generate a flow of hydraulic fluid in response to the mechanical power output;
    a plurality of wheel end assemblies coupled to the hydraulic pump via a hydraulic circuit, the hydraulic circuit including:
    a hydraulic fluid that, when circulated by the hydraulic pump, provides a flow of hydraulic fluid for operating a hydraulic motor associated with each wheel end assembly; and
    a scavenge pump disposed to receive a portion of the flow of hydraulic fluid generated by the hydraulic pump, and the scavenge pump being fluidly coupled to each of the plurality of wheel end assemblies and the hydraulic motor associated with each wheel end assembly for directing at least a portion of the flow of hydraulic fluid into a wheel hub support housing for lubricating a wheel hub drive assembly, wherein the scavenge pump directs the at least a portion of the hydraulic fluid into the wheel hub support housing for lubricating the wheel hub drive assembly without directing the at least a portion of hydraulic fluid to the hydraulic motor.

11. The machine of claim 10, further including a hydraulic implement fluidly coupled to the hydraulic circuit.

12. The machine of claim 11, wherein the hydraulic implement includes a hydraulic cylinder.

13. The machine of claim 10, wherein the scavenge pump includes a gerotor disposed substantially at an input of the wheel hub drive assembly for regulating flow of hydraulic fluid based on a rotational speed of a shaft associated with the wheel hub drive assembly.

14. The machine of claim 10, wherein the hydraulic circuit further includes a fluid refill port and a fluid drain port for servicing the hydraulic fluid associated with the plurality of wheel end assemblies substantially simultaneously.

15. A wheel end assembly, comprising:
    a wheel hub support housing;
    a wheel hub drive assembly rotatably connected to the wheel hub support housing;
    a hydraulic motor operatively coupled to the wheel hub drive assembly, the hydraulic motor being disposed to deliver a torque to the wheel hub drive assembly to rotate the wheel hub support housing;
    a pump, fluidly coupled to the wheel hub drive assembly and fluidly coupled to the hydraulic motor in an open-circuit manner, the pump being disposed to provide a flow of hydraulic fluid to the wheel hub drive assembly; and
    wherein the pump is disposed in the wheel hub support housing.

16. The wheel end assembly of claim 1, wherein the pump is disposed in the wheel hub support housing.

17. The machine of claim 10, wherein:
    the scavenge pump is one of a plurality of scavenge pumps of the hydraulic circuit, each of the scavenge pumps being disposed to receive a portion of the flow of hydraulic fluid generated by the hydraulic pump, and each of the scavenge pumps being fluidly coupled to one of the plurality of wheel end assemblies and the hydraulic motor associated with each wheel end assembly for directing at least a portion of the flow of hydraulic fluid into a wheel hub support housing for lubricating a wheel hub drive assembly; and
    each of the scavenge pumps is disposed in one of the wheel hub support housings.

18. The wheel end assembly of claim 15, wherein the pump is disposed to provide the flow of hydraulic fluid to the wheel hub drive assembly without the pump providing the flow of hydraulic fluid to the hydraulic motor.

* * * * *